United States Patent
Walimbe et al.

(10) Patent No.: US 6,552,600 B2
(45) Date of Patent: Apr. 22, 2003

(54) INITIALIZATION OF NEGATIVE CHARGE PUMP

(75) Inventors: Priya Walimbe, Folsom, CA (US); Rajesh Sundaram, Fair Oaks, CA (US); Bo Li, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/809,623

(22) Filed: Mar. 15, 2001

(65) Prior Publication Data
US 2002/0130700 A1 Sep. 19, 2002

(51) Int. Cl.[7] .................................................. G05F 3/02
(52) U.S. Cl. .................................. 327/536; 327/537
(58) Field of Search ................................. 327/390, 536, 327/589, 590, 157, 537; 365/189.09, 218

(56) References Cited

U.S. PATENT DOCUMENTS 5,335,200 A * 8/1994 Coffman et al. ............. 365/218
5,889,428 A * 3/1999 Young ........................ 327/536
6,111,470 A * 8/2000 Dufour ....................... 327/536
6,184,741 B1 * 2/2001 Ghilardelli ................. 327/536
6,366,158 B1 * 4/2002 Zeng et al. ................. 327/536

* cited by examiner

Primary Examiner—Tuan T. Lam
Assistant Examiner—Hiep Nguyen
(74) Attorney, Agent, or Firm—Blakely, Sokoloff, Taylor & Zafman LLP

(57) ABSTRACT

An improvement in initializing a charge pump circuit. After a charge pump circuit is turned off, the relatively high voltages in its nodes are discharged (initialized) to prevent electrical stress and eventual component failure. The transistors used to discharge these nodes receive a control signal of the same polarity as the voltage being discharged. When the charge pump is generating a negative voltage, the output of the final stage of the pump can be used to provide this negative control signal to discharge the negative voltages from the internal nodes. A delayed second signal can be used to discharge the final stage.

18 Claims, 6 Drawing Sheets

INITIALIZATION OF NEGATIVE CHARGE PUMP

BACKGROUND OF THE INVENTION

1. Field of the Invention

The invention pertains generally to computer circuits. In particular, it pertains to charge pump circuits.

2. Description of the Related Art

A charge pump circuit is a circuit that can produce an output voltage that is higher than the circuit's supply voltage. This is accomplished in a series of stages, with each stage increasing the voltage from its input to its output by moving charge in that direction, with the output providing the input of the next stage. By cascading enough stages in this manner, an output voltage that is several times the circuit's supply voltage can be produced.

Charge pump circuits can be used to increase voltage in both the positive and negative directions. For example, a positive charge pump circuit with a supply voltage of Vcc=+3 volts might be used to produce an output voltage of approximately +10 volts, while a negative charge pump circuit with the same Vcc supply voltage might be used to produce an output voltage of approximately −10 volts by moving charge in the opposite direction. FIG. 1 shows a schematic for a single stage 1 of a negative charge pump circuit, including charge pump cell 10, in which the clock signals CLK1 and CLK2 that alternate between Vcc and 0 volts are used to create an output voltage at output 13 that is more negative than the input voltage at input 11. Because the voltage difference across a capacitor cannot change instantaneously, CLK1 causes the voltage at input 11 to be alternately higher and lower than at output 13, while CLK2 turns on the switchable diode comprised of transistors T1–T3 only when input 11 has a higher voltage than output 13. This operation causes charge to flow from the input to the output, but prevents it from flowing in the opposite direction. The input of a following stage (not shown) will have its input connected to output 13, and will also have two similar clocks that are timed with CLK1 and CLK2 to assure that the charge flows into that following stage from charge pump stage 1. The current flow and voltage buildup in the negative direction occurs from right to left in FIG. 1. If this were a positive charge pump, the schematic would look basically the same, but the current flow and voltage buildup would proceed from left to right, and the relative timing (not shown) between the clock signals would be different. The basic operation of positive and negative charge pump circuits is well known, and will not be discussed further.

The relatively high voltages in the latter stages of a multi-stage charge pump circuit can cause stress and eventual failure in the semiconductor material if those voltages are allowed to remain too long. Because of the likelihood of stress and damage as the part undergoes operation cycles over time, the capacitors of a charge pump are discharged after the pump is turned off to prevent retention of these high voltages for long periods of time. This process of discharging is called 'initialization' and is typically controlled by a portion of the charge pump shown in FIG. 1 as initialization circuit 12, which turns on transistors T5, T4 that are connected between nodes 1, 2 and ground. In a positive charge pump, a positive voltage is being discharged by this initialization circuit. Since only positive voltages are involved, the discharge transistor can be controlled by a positive logic signal, which is easily derived in the surrounding control logic that is operating between Vcc and ground.

However, with a negative charge pump a high negative voltage must be discharged by initialization circuit 12, and this requires a negative control signal to turn on the negatively biased discharge transistors T4, T5. Transistors in conventional charge pumps do not use triple well technology (where multiple nested 'wells' of alternately doped semiconductor material are used to electrically isolate the transistor from the underlying substrate). They cannot use an n-type transistor to transfer a negative voltage, as that would forward bias the diode between the n+ doping and the to p− substrate. Therefore, conventional negative charge pumps and the associated control circuitry use p-type devices only. The necessary negative control signal is created by implementing another negative charge pump circuit 14, with a switchable output, whose sole purpose is to generate a negative voltage to operate the negatively-biased discharge transistors T4, T5. Charge pumps require a relatively large amount of die space, and this initialization charge pump circuit 14 uses up valuable space on the die that could otherwise be used for additional flash memory capacity or other important functions.

Another method of initialization involves discharging the node to Vcc instead of ground, which eliminates the need for the additional negative charge pump. However, this requires additional time to charge the pump when operation is first started, since the nodes have to charge down from Vcc instead of ground. When used in flash memory, this slows down the overall speed of the erase operation.

DETAILED DESCRIPTION OF THE INVENTION

An embodiment of the invention uses an output voltage of the negative charge pump itself as the negative control signal to operate the discharge transistors during an initialization. This signal can be switched on and off at appropriate times so that the discharge transistors are turned on during the initialization period.

Figure 2:
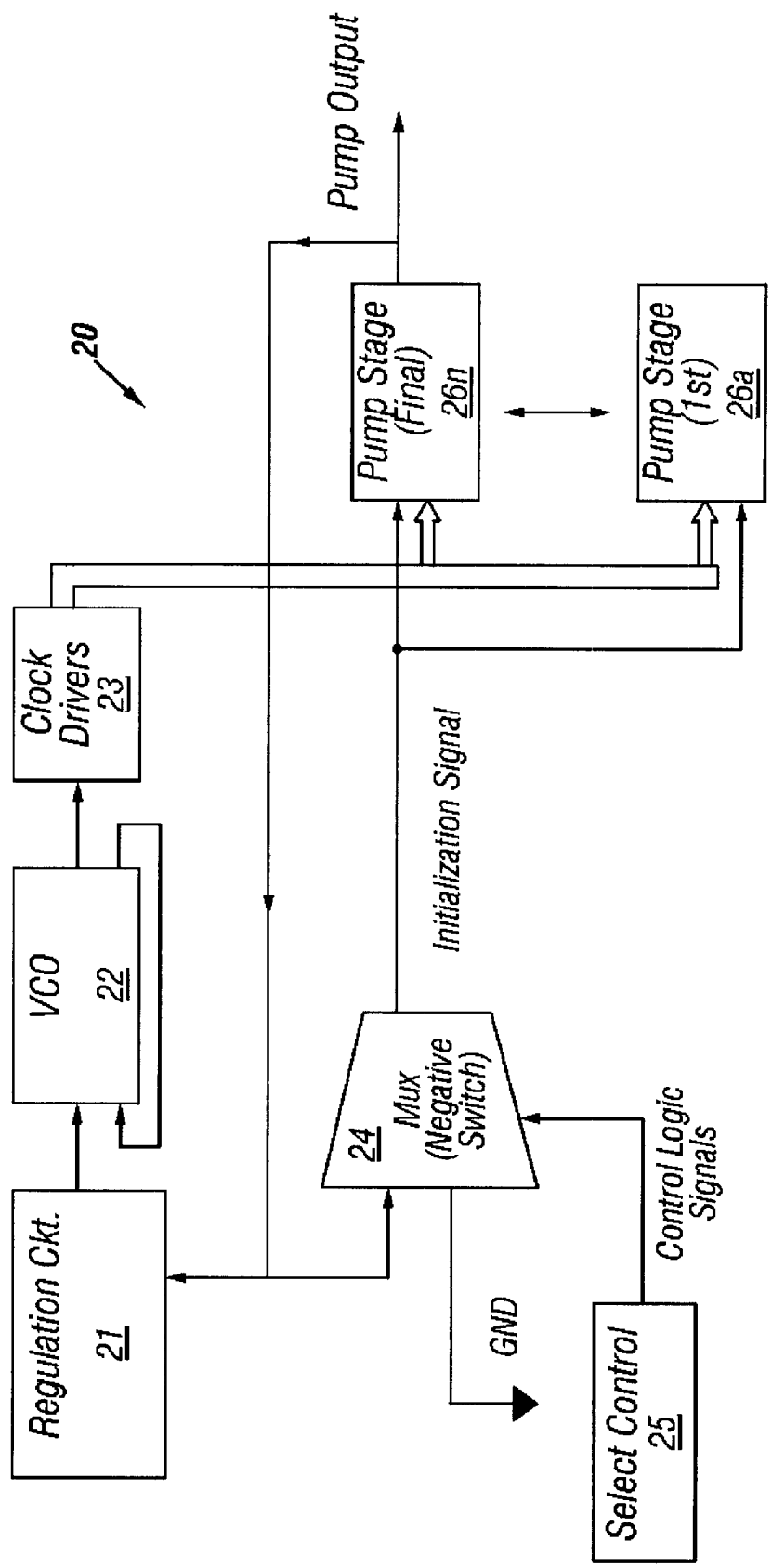
FIG. 2 shows an embodiment of a charge pump circuit of the invention.

FIG. 2 shows a system 20 implementing this feedback mechanism. As in conventional charge pump circuits, a clock generation system can be comprised of a regulation circuit 21, voltage controlled oscillator (VCO) 22, and clock drivers 23. VCO 22 can output one or more clock signals at a frequency that varies with the voltage level it receives from regulation circuit 21, while clock drivers 23 can output multiple clock signals operating at the same variable frequency, but that have predefined phase and timing relationships with each other. These clocks can drive charge pump stages 26a–26n, where n is the number of charge pump stages. In one embodiment there are four clock signals, with the odd numbered stages being driven by two of these clocks and the even numbered stages being driven by the other two clocks, as is known in the art. The frequency of these clocks can affect the rate of charge buildup in each of pump stages 26a–n, while the load being driven by the final stage can affect how fast the charge is carried away. Thus, the load can affect the voltage being delivered by the final output stage 26n. To regulate this voltage output under varying loads, the voltage output of stage 26n can be fed back to regulation circuit 21, which can divide it (or multiply it) by an appropriate factor so that it provides a suitable control voltage to VCO 22. Regulation circuit 21 can comprise a voltage divider network, a differential amplifier, a combination of these, or some other appropriate circuit. Regardless of the type of circuitry used in regulation circuit 21, a change of voltage at the output of pump stage 26n results in a corresponding change of voltage at the input of VCO 22, which adjusts its frequency accordingly. This change of frequency results in a change of frequency for clock drivers 23, which in turn changes the rate of charge buildup in pump stages 26a–n so that the voltage delivered at the output of final stage 26n will remain relatively constant under changing load conditions.

The feedback signal from final pump stage 26n can also be used as a control signal to operate the pump initialization circuits. This feedback signal can be provided to one of the inputs of a multiplexer 24, while another voltage level, such as signal ground, can be provided to the other input of multiplexer 24. Control logic 25 can control multiplexer 24 so that a selected one of the two inputs is fed to the multiplexer output and becomes the initialization signal. Control logic 25 can be conventional initialization control logic that turns an initialization signal on and off. Multiplexer 24 is shown as a multiplexer circuit in this embodiment, but can be any kind of switch capable of switching between the two inputs, one of which is a negative voltage from the charge pump circuit output. In one embodiment, the alternate input is 0 volts, typically signal ground. In other embodiments, the alternate input can be another voltage level, such as Vcc, that also results in turning off the initialization transistors.

Figure 1:
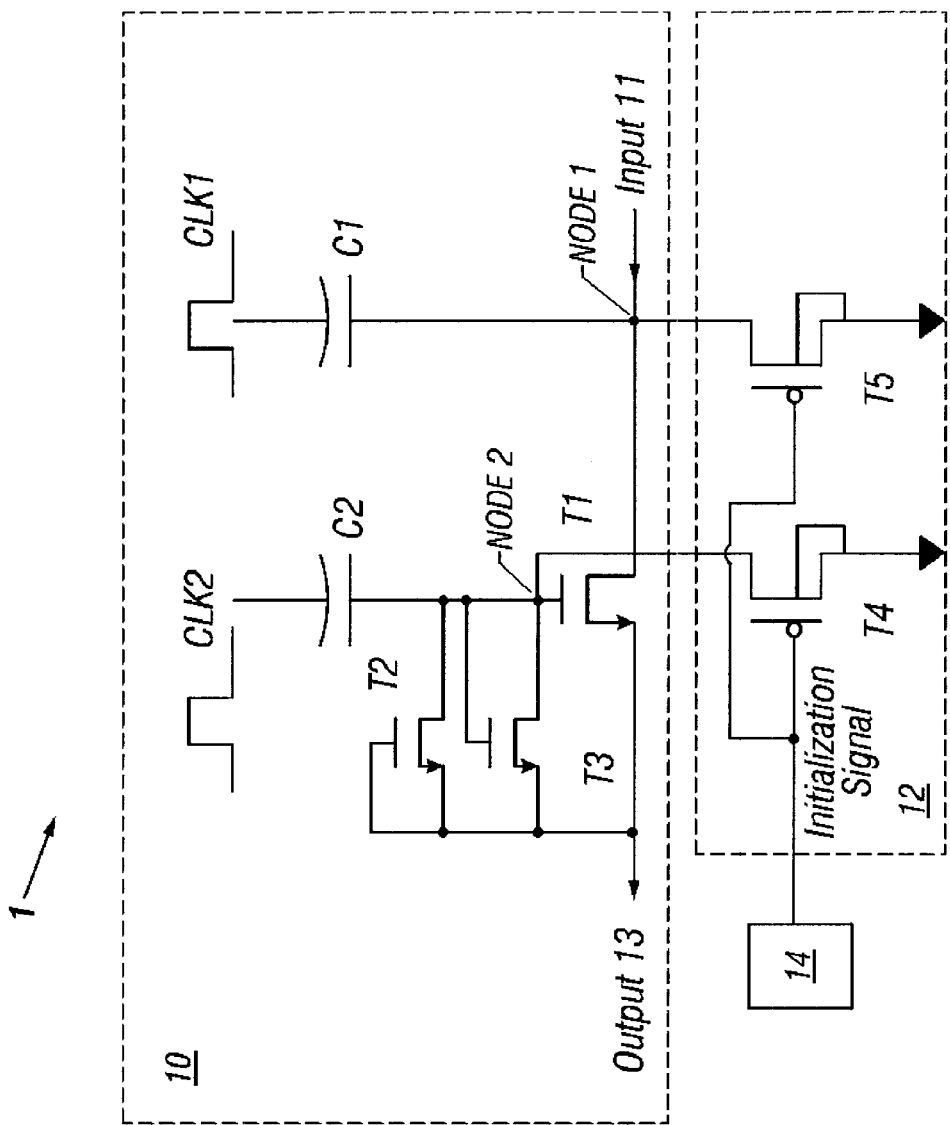
FIG. 1 shows a single stage and initialization circuit in a conventional negative charge pump circuit.
Figure 3:
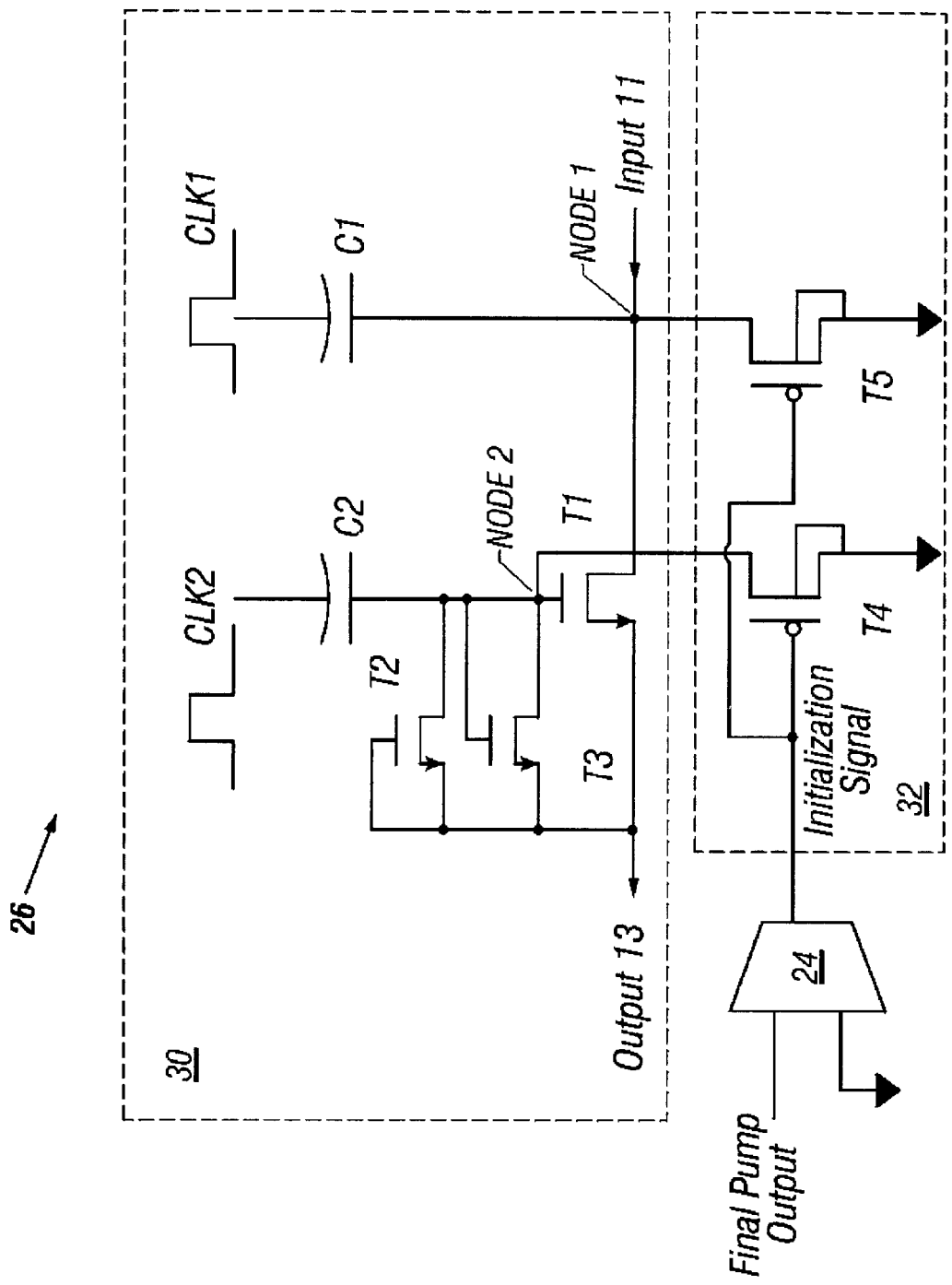
FIG. 3 shows a single stage and initialization circuit in an embodiment of a charge pump circuit of the invention.

FIG. 3 shows a charge pump stage 26, which can represent each of pump stages 26a–26n. Charge pump stage 26 can include charge pump cell 30 and its associated initialization circuit 32, in which the initialization circuit is driven by the initialization signal from the output of multiplexer 24. Since each stage of a multi-stage charge pump produces a different voltage level, in one embodiment each stage can have a separate initialization circuit 32, each with two discharge transistors to discharge the two nodes of the stage. In one embodiment, charge pump cell 30 and initialization circuit 32 can be identical to charge pump cell 10 and initialization circuit 12 of FIG. 1, as indicated by the use of identical designators T1–T5 and C1–C2 in both drawings. However, the source of the initialization signal is significantly different between the two drawings.

In one embodiment, the initialization signal from a single multiplexer 24 can be used to turn on the initialization transistors of all stages in the charge pump circuit. In another embodiment, multiple such multiplexers 24 can be employed, with each driving a portion of the initialization circuits in the various stages. This choice can be made based on the number of such gates that can be reliably driven by the current available from the output of multiplexer 24. This choice can also be made based on routing considerations, in which additional multiplexers 24 can reduce routing for the initialization signal enough to justify their inclusion on the die. This approach can also be implemented to provide different voltages for the initialization of different stages or groups of stages.

In other various embodiments, the output of the charge pump can be coupled to the initialization circuit(s) through other circuitry (not shown). This may be used to condition or otherwise alter the output signal in some way, such as reducing the voltage level, before it is presented to the initialization circuit. One embodiment can use a voltage divider circuit to reduce the output signal to a lower voltage to avoid stress on the initialization circuit(s).

Figure 4:
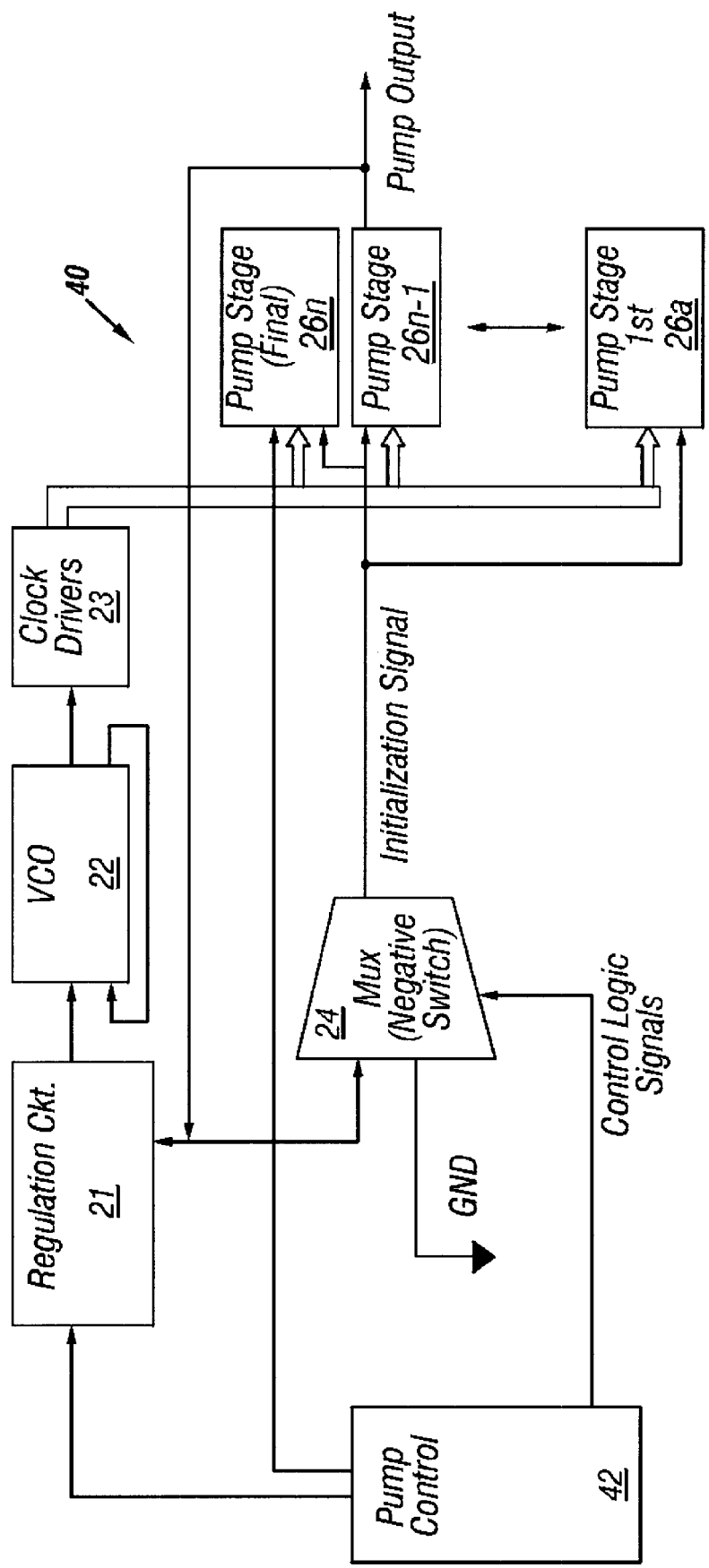
FIG. 4 shows a system including an embodiment of a charge pump circuit of the invention.

FIG. 4 shows a system 40 that includes the overall control of the charge pump circuit. In addition to the circuits shown in FIG. 2, FIG. 4 also shows a pump control circuit 42, which can provide overall control of the operation of the charge pump. In one embodiment, pump control circuit 42 is operated by micro-code. When a decision is made to turn on the charge pump, a signal can be asserted from pump control circuit 42 to regulation circuit 21, enabling it to provide a voltage to VCO 22. This starts VCO 22, which starts generating the clock signals provided by clock drivers 23 to operate the charge pump cells 26a–26n. When the charge pump is to be turned off, this signal to regulation circuit 21 can be deasserted, causing regulation circuit 21 to stop the VCO and the clocks, thereby stopping the charge pump cells from operating. Alternately, the signal to start/stop the charge pumps can be asserted to VCO 22, clock drivers 23, or to addition logic (not shown) that will stop the clocks from reaching pump cells 26a–26n. This choice, and the methods of implementing it, are known in the art and are not discussed further.

Pump control circuit 42 can also provide a control signal to multiplexer 24 to selectively provide the initialization signal to the pump stages in the manner previously described. In the embodiment shown in FIG. 4, pump control circuit 42 includes the select control circuit 25 of FIG. 2.

Pump control circuit 42 can also provide a separate initialization signal to the final charge pump stage. In the illustrated embodiment of FIG. 4, the initialization signal from multiplexer 24 is provided only to the internal nodes, i.e., to the nodes of all but the output node of the final stage, and these internal nodes are thereby discharged. The output node of the final stage (node 2 in FIG. 3) is permitted to remain high for a longer period of time, providing a continuing source of negative voltage for the initialization signal from multiplexer 24. After a suitable time delay, a separate initialization signal from pump control 42 can be provided to the final stage, permitting the output node of the final stage to discharge. In one embodiment, the separate initialization signal is asserted approximately 2 microseconds after the initialization signal from multiplexer 24 is asserted. Both initialization signals can be deasserted after their associated nodes have had time to discharge.

Figure 5:
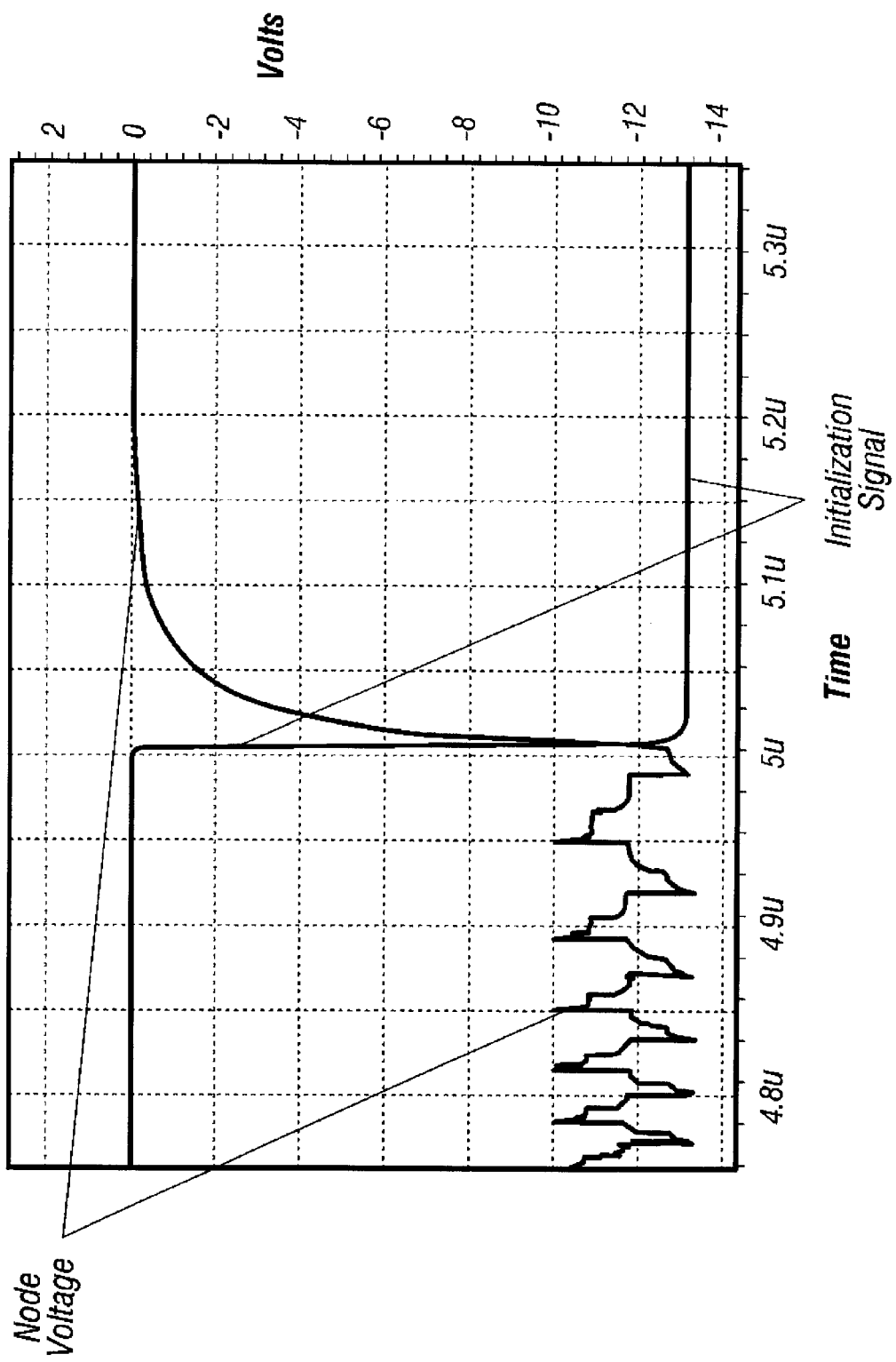
FIG. 5 shows a graph of selected signals of the charge pump circuit.

FIG. 5 shows a waveform graph for a given cell for one embodiment. As can be seen, the charge pump is running prior to the 5 microsecond (5 u) mark in the graph, as indicated by the characteristic waveform of the node voltage. The shape of this waveform is characteristic of the node voltage at any stage of a charge pump. However, in the illustrated embodiment the average of this node voltage is slightly less than –12 volts, while the final stage outputs a voltage of slightly more than –13 volts, so the illustrated waveform can represent a node in the next-to-last stage (stage 26n-1) of a negative charge pump. This choice of node voltage in FIG. 5 is strictly for illustration; other nodes with other voltage levels could be used without changing the principles involved.

With reference to FIGS. 3 and 5, while the charge pump is running, the initialization signal is held at 0 volts and therefore keeps the discharge transistors T4 and T5 turned off. At the 5 u mark in the graph, the charge pump is turned off by stopping the clock signals to the charge pump cells. At the same time, the initialization signal is switched to the output of the final stage and immediately goes to −13 volts. This turns on the discharge transistor, which can quickly discharge the associated capacitor, changing the node voltage to 0 volts in slightly more than 0.1 microseconds. The initialization signal can be switched back to 0 volts at this point, or it can be allowed to continue tracking the output voltage of the final stage. A short time later, a signal from pump control circuit 42 (FIG. 4) can be used to discharge the output node of the final stage to 0 volts, and the initialization signal (if still connected to the output of the final stage) will also return to 0 volts. In one embodiment, this happens about two microseconds after the initialization signal is turned on, and is therefore not visible in the chart of FIG. 5.

The chart of FIG. 5 is used for illustration purposes only, and should not be interpreted as a limitation on the scope of the invention. For example, the start of the initialization signal need not coincide exactly with stopping the clocks to the charge pump cells, as it does in FIG. 5. The time to discharge a node may be longer or shorter than the time shown. The nodes might be discharged to some level other than ground, and the level of the initialization signal during pump operation can be some voltage other than 0 volts. These considerations are design choices that depend on factors not discussed here, and are within the ability of a person of ordinary skill in the art to decide.

Figure 6:
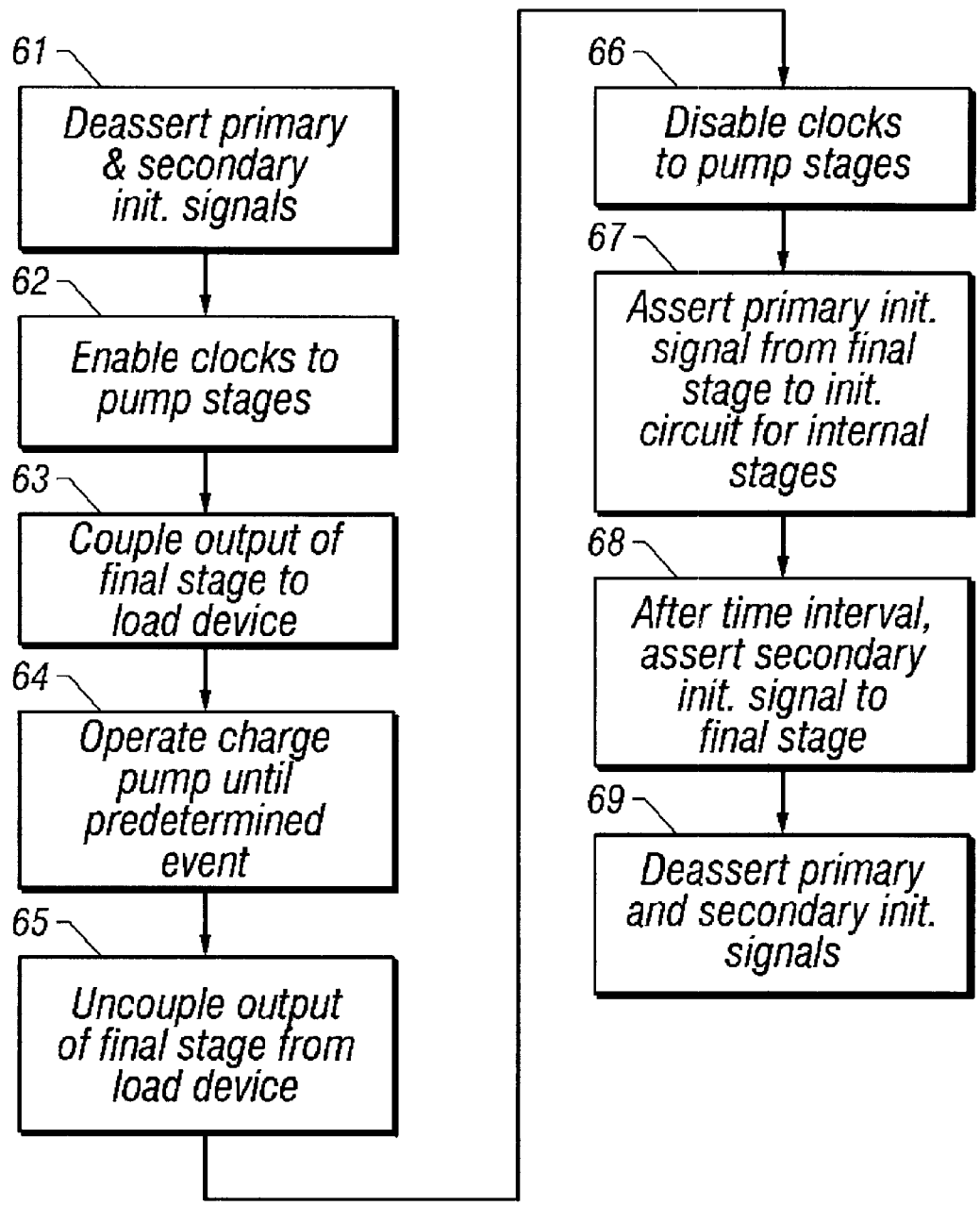
FIG. 6 shows a flow chart of a method of the invention.

FIG. 6 shows a flow chart of a method. In one embodiment, this method can be executed by pump control 42, which can be implemented in micro-code. At block 61, the primary initialization signal to the interior pump stages and the secondary initialization signal to the final pump stage are deasserted. This can mean that the signals are brought from the asserted state to the deasserted state, but can also mean that the signals are already in the deasserted state and simply remain that way. At block 62, the clock signals to the pump stages are enabled. As previously described, there are multiple ways in which the clock signals can be brought to the pump stages to begin operation of the charge pump circuit. In one embodiment, this is accomplished by asserting a signal to the clock generation circuitry so that it will begin outputting the necessary clock signals. Due to the sequential nature of multistage charge pumps, it typically takes multiple clock cycles for the output of the final pump stage to ramp up to the desired output voltage. To avoid presenting a lesser voltage to the load device, this output can remain decoupled from the load device until the output of the final pump stage has reached its planned voltage level. Then the final output stage can be coupled to the load device at block 63. At this point, the desired high voltage is being delivered to the load device, such as a flash memory erase circuit, and continues to do so until some event indicates that the load device no longer needs that high voltage at block 64. This event might be a signal that the erase function of a flash memory has completed. It could also indicate when a timer has timed out. Regardless of what creates it, this event can signal the circuitry that the high voltage from the charge pump is no longer needed. The load device can then be uncoupled from the output of the charge pump at block 65, and the clocks to the charge pump turned off or disabled at block 66. At this point, the primary initialization signal can be asserted to discharge the internal nodes of the charge pump at block 67. This primary initialization signal can be the negative output of the final stage of the charge pump. After a time interval, when the internal nodes have been discharged, a secondary initialization signal can be asserted at block 68 to discharge the node(s) in the final stage of the charge pump. At this point, all nodes in the charge pump have been discharged, and there is no longer any need for either of the initialization signals. They can be deasserted at block 69. Blocks 61 and 69 both show deasserting the initialization signals, indicating that either the initialization signals can remain asserted until just before the charge pump is to be operated at block 61, or the initialization signals can be deasserted when the charge pump completes operation at block 69, and remain deasserted when the charge pump is restarted at block 61.

In an alternative embodiment, block 65 can be relocated to follow block 69, so that the final stage is uncoupled from the load device after the pump stages are discharged.

The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others. In one embodiment, the machine-readable medium contains microinstructions, which can be contained in pump control circuit 42.

The foregoing description is intended to be illustrative and not limiting. Variations will occur to those of skill in the art. Those variations are included in the invention, which is limited only by the spirit and scope of the appended claims.

We claim:

1. An apparatus, comprising:
    a charge pump circuit having a plurality of serially-coupled stages, with a final stage of the plurality of serially-coupled stages having an output node to produce a negative output voltage and remaining stages of the plurality of serially-coupled stages having internal nodes;
    an initialization circuit coupled to a respective one of the internal nodes to discharge said respective one of the internal nodes responsive to an assertion of the initialization signal;
    a multiplexer coupled to an input of the initialization circuit and to the output node to decouple, responsive to a first control signal, the input of the initialization circuit from a first input signal and to couple, responsive to the first control signal, the input of the initialization circuit to a second input signal from the output node to discharge the respective one of the internal nodes; and
    a control circuit coupled to the multiplexer to provide the first control signal.

2. The apparatus of claim 1, wherein the first input signal is signal ground.

3. The apparatus of claim 1, further including a plurality of discharge transistors coupled to the plurality of internal nodes to discharge said internal nodes responsive to said assertion.

4. The apparatus of claim 1, wherein:
    the control circuit is to provide a second control signal to discharge the output node subsequent to discharging said respective one of the internal nodes.

5. A system, comprising:
a charge pump circuit having a plurality of serially-coupled stages, with a final stage of the plurality of serially-coupled stages having an output node to produce a negative output voltage and remaining stages of the plurality of serially-coupled stages having internal nodes;
an initialization circuit having a plurality of outputs, each output coupled to a respective one of the internal nodes to discharge said internal nodes responsive to assertion of an initialization signal;
a charge pump controller coupled to the charge pump circuit and the initialization circuit to control operation of the charge pump circuit;
a multiplexer coupled to an input of the initialization circuit and to the output node to decouple, responsive to a first control signal, the input of the initialization circuit from a first input signal and to couple, responsive to the first control signal, the input of the initialization circuit to a second input signal from the output node to discharge the plurality of serially-coupled stages; and
a control circuit coupled to the multiplexer to provide the first control signal.

6. The system of claim 5, wherein the first input signal is signal ground.

7. The system of claim 5, further including a plurality of discharge transistors coupled to the plurality of internal nodes to discharge said internal nodes responsive to said assertion.

8. The system of claim 5, wherein:
the control circuit is to provide a second control signal to discharge the output node subsequent to discharging said internal nodes.

9. A method, comprising:
operating a charge pump circuit with clock signals;
stopping the charge pump circuit by stopping the clock signals; and
connecting a voltage output of the charge pump circuit through a multiplexer as an input to an initialization circuit to discharge internal nodes in the charge pump circuit.

10. The method of claim 9, further comprising discharging an output node of a final stage of the charge pump circuit after discharging the internal nodes.

11. The method of claim 9, wherein said discharging the internal nodes includes turning on a discharge transistor with the voltage output.

12. The method of claim 9, wherein said stopping the charge pump circuit includes stopping the charge pump circuit after an occurrence of a predetermined event.

13. A machine-readable medium having stored thereon instructions, which when executed by a processor cause said processor to perform:
starting a charge pump circuit;
stopping the charge pump circuit; and
coupling a voltage output of the charge pump circuit to an input of an initialization circuit through a multiplexer to discharge internal nodes in the charge pump circuit.

14. The medium of claim 13, further comprising discharging an output node of a final stage of the charge pump circuit after discharging the internal nodes.

15. The medium of claim 13, wherein said discharging the internal nodes includes using the voltage output to turn on a discharge transistor.

16. The medium of claim 13, wherein said stopping the charge pump circuit includes stopping the charge pump circuit after an occurrence of a predetermined event.

17. The apparatus of claim 1, wherein:
the output node is decoupled by the multiplexer from the input of the initialization circuit during operation of the charge pump and coupled through the multiplexer to the input of the initialization circuit responsive to stopping the operation of the charge pump.

18. The system of claim 5, wherein:
the output node is decoupled by the multiplexer from the input of the initialization circuit during operation of the charge pump and coupled through the multiplexer to the input of the initialization circuit responsive to stopping the operation of the charge pump.

* * * * *